United States Patent
Irwin et al.

(10) Patent No.: US 9,971,612 B2
(45) Date of Patent: May 15, 2018

(54) WIDGET EXECUTION DEVICE AND ASSOCIATED APPLICATION FOR USE THEREWITH

(75) Inventors: James Irwin, Newbury (GB); David Pollington, Newbury (GB)

(73) Assignee: VODAFONE GROUP PLC., Newbury, Berkshire (GB)

( * ) Notice: Subject to any disclaimer, the term of this patent is extended or adjusted under 35 U.S.C. 154(b) by 602 days.

(21) Appl. No.: 12/462,785

(22) Filed: Aug. 7, 2009

(65) Prior Publication Data

US 2010/0042692 A1 Feb. 18, 2010

(30) Foreign Application Priority Data

Aug. 14, 2008 (GB) .................................. 0814800.9

(51) Int. Cl.
| | |
|---|---|
| *G06F 15/16* | (2006.01) |
| *G06F 9/445* | (2018.01) |
| *H04N 21/235* | (2011.01) |
| *H04N 21/4227* | (2011.01) |
| *H04N 21/435* | (2011.01) |
| *H04N 21/658* | (2011.01) |
| *H04N 21/81* | (2011.01) |

(52) U.S. Cl.
CPC ............ *G06F 9/44526* (2013.01); *G06F 8/60* (2013.01); *H04N 21/235* (2013.01); *H04N 21/4227* (2013.01); *H04N 21/435* (2013.01); *H04N 21/6581* (2013.01); *H04N 21/8173* (2013.01)

(58) Field of Classification Search
CPC .............................. H04L 29/00; H04L 49/552
USPC .......................................................... 709/206
See application file for complete search history.

(56) References Cited

U.S. PATENT DOCUMENTS

| | | | |
|---|---|---|---|
| 6,792,616 B1 * | 9/2004 | Jerding .................. | H04N 7/165 348/E7.063 |
| 2003/0177497 A1 * | 9/2003 | Macrae et al. ................. | 725/60 |

(Continued)

FOREIGN PATENT DOCUMENTS

| | | |
|---|---|---|
| EP | 1 259 036 A1 | 11/2002 |
| EP | 1 950 934 A1 | 7/2008 |

(Continued)

OTHER PUBLICATIONS

AppleInsider, "Apple filing depicts Apple TV with iChat widget interface", http://www.appleinsider.com/articles/08/02/07/apple_filing_depicts_apple_tv_with_ichat_widget_intervace, APPL: 166.237 (+2.327), 5 Pages, Feb. 7, 2008.

(Continued)

*Primary Examiner* — Viet D Vu

(74) *Attorney, Agent, or Firm* — Workman Nydegger

(57) ABSTRACT

A method of controlling a widget execution device configured for use with a television includes: using a control application on a mobile terminal to wirelessly identify one or more widgets in a data network environment, such that the one or more widgets are suitable for download to the widget execution device; and using the control application to cause the download of the one or more widgets to the widget execution device. The method may involve identifying the one or more widgets on a remote server, the remote server being in communicable relation with the widget execution device; and causing the download of the one or more widgets by selecting the one or more widgets.

21 Claims, 2 Drawing Sheets

(56) References Cited

U.S. PATENT DOCUMENTS

| | | | |
|---|---|---|---|
| 2004/0139472 A1* | 7/2004 | Furet | G06T 9/007 |
| | | | 725/109 |
| 2007/0101297 A1 | 5/2007 | Forstall et al. | |
| 2007/0186007 A1* | 8/2007 | Field et al. | 709/233 |
| 2007/0204039 A1* | 8/2007 | Inamdar | G06F 21/10 |
| | | | 709/225 |
| 2008/0005764 A1* | 1/2008 | Arling | H04H 60/46 |
| | | | 725/39 |
| 2008/0034309 A1 | 2/2008 | Louch et al. | |
| 2008/0098290 A1* | 4/2008 | Williams et al. | 715/209 |
| 2008/0194276 A1* | 8/2008 | Lin | H04L 61/2015 |
| | | | 455/466 |
| 2008/0288980 A1* | 11/2008 | Schein et al. | 725/39 |
| 2008/0294998 A1* | 11/2008 | Pyhalammi et al. | 715/748 |
| 2009/0052870 A1* | 2/2009 | Marsh | H04N 7/17318 |
| | | | 386/292 |
| 2009/0222874 A1* | 9/2009 | White et al. | 725/118 |
| 2009/0229610 A1* | 9/2009 | Oates | A61M 16/0057 |
| | | | 128/204.21 |
| 2009/0235149 A1* | 9/2009 | Frohwein | 715/205 |
| 2009/0288004 A1* | 11/2009 | Strandell | G06F 9/4443 |
| | | | 715/710 |
| 2010/0042692 A1* | 2/2010 | Irwin et al. | 709/206 |
| 2010/0240350 A1* | 9/2010 | Ilkanaev et al. | 455/419 |

FOREIGN PATENT DOCUMENTS

| | | |
|---|---|---|
| WO | WO2001/69848 A2 | 9/2001 |
| WO | WO 2006/115862 A1 | 11/2006 |
| WO | WO2007/035514 A2 | 3/2007 |
| WO | WO2008/047192 A2 | 4/2008 |
| WO | WO2009/015571 A1 | 2/2009 |

OTHER PUBLICATIONS

"Widgets—including iChat—Coming to Apple TV?", http://parislemon.com/2008/02/widgets-including-ichat-coming-to-apple.html, 5 Pages, Feb. 7, 2008.

AppleInsider, "Apple filing depicts Apple TV with iChat widget interface", http://www.appleinsider.com/articles/08/02/07/apple_filing_depicts_apple_tv_with_ichat_widget_interface.html, AAPL: 94.75 (0.00), 12 Pages, Feb. 7, 2008.

"Widgets—including iChat—Coming to Apple TV?", http://parislemon.com/2008/02/widgets-including-ichat-coming-to-apple.html, 3 Pages, Feb. 7, 2008.

* cited by examiner

WIDGET EXECUTION DEVICE AND ASSOCIATED APPLICATION FOR USE THEREWITH

TECHNICAL FIELD

This application relates to a device with computing capabilities and a technique for interacting with the device and, more particularly, to a widget execution device capable of being used with a television, and devices configured to remotely communicate and exchange data and information with the widget execution device.

BACKGROUND

In a computing context, a "widget" is a single function application that performs a specific task or function. It is a portable, self-contained reusable module of functionality that can be executed on any compatible platform. In this regard widgets are generally coded in Javascript since this language has a wide acceptance. A widget could also be described as an executable file or applet, a module, snippet or plug-in.

Today widgets are commonly used on computers and mobile terminals, such as mobile telephones, Personal Digital Assistants (PDAs), in order to display information to the user or provide a particular functionality. Many, but not all, widgets leverage web technologies to perform a specific task or function and display something to the user. An example of one such application is a stock-market widget that displays the share price of certain stocks, for example stocks pre-designated by the user. A further example is a widget that is configured to display weather details for one or more pre-designated or user-designated locations.

The displayed information may invite the user to act in any number of ways. For instance, the user may simply view the displayed information or use graphical components, such as buttons, dialog boxes, pop-up windows, pull-down menus, icons, scroll bars, resizable window edges, progress indicators, selection boxes, windows, tear-off menus, menu bars, toggle switches and/or forms to interact with the widget.

A widget has even been created that allows users to watch television on their computers over a broadband connection. Whilst this is a useful desktop functionality, to date it is not a functionality that has made televisions obsolete: people still generally prefer to watch television on a dedicated television set.

Also, there is still a significant segment of the population who do not have a computer, let alone with Internet access, and who therefore have no access whatsoever to widgets, and the enhanced functionality they can provide.

To counter this widget television usage on computers, there has been some movement by television manufacturers towards providing some of the functionalities currently available via widgets on televisions, but the systems that have been proposed are to date quite limited.

An example of one such service is AQUOS Net™ a service that provides customized Web-based content to an AQUOS™ television. The system works by providing the Internet content in a segment overlaying the main television image. A problem with this system is that to obtain the service, users must purchase a compatible AQUOS™ television, since the Internet gateway circuitry is embedded within the television circuitry. This is an expensive option, and not all users will be willing to partake in such a wholesale upgrade just to obtain access to web-based content on their television.

A further problem is that the widgets used on the AQUOS™ television may need to be supported widgets, in that they are compatible with the proprietary AQUOS™ system. This therefore limits the number and type of widgets that are available.

There is therefore a need for an improved mechanism for enabling widgets to be displayed on televisions, and particularly a mechanism that enables existing television models to be used.

SUMMARY OF THE INVENTION

According to the system described herein, a method of controlling a widget execution device configured for use with a television includes: using a control application on a mobile terminal to wirelessly identify one or more widgets in a data network environment, such that the one or more widgets are suitable for download to the widget execution device; and using the control application to cause the download of the one or more widgets to the widget execution device.

In this way, by providing a widget execution engine/widget box that is able to be utilised alongside a television, information can be accessed significantly faster than the time taken to boot up a computer and connect it to the Internet.

Further, by operating the widget execution engine in conjunction with a mobile terminal, the remote functionality of the mobile terminal can be taken advantage of. In this regard, it becomes possible for a user to remotely interact with the widget execution engine, and in particular allows the user to effect downloads of widgets remotely, without needing to physically operate the execution engine. An embodiment of this interaction also utilises a remote widget server, which is also in communicable relation with the widget execution engine.

BRIEF DESCRIPTION OF THE DRAWINGS

Embodiments of the system described herein are explained in detail below using the figures, which are briefly described as follows.

DETAILED DESCRIPTION OF VARIOUS EMBODIMENTS

Figure 1:
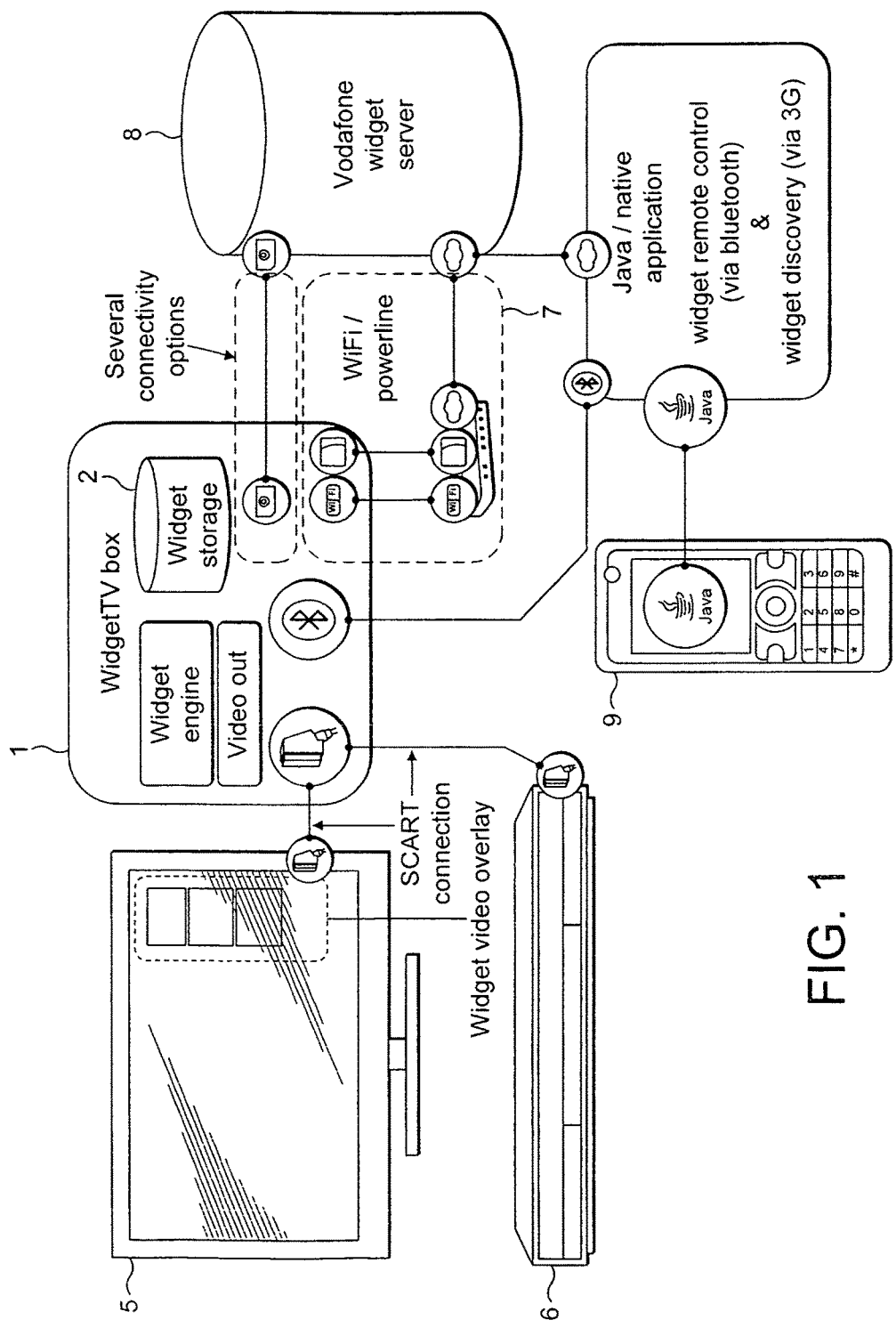
FIG. 1 illustrates an example arrangement in which a widget box according to an embodiment of the system described herein may be utilised.

FIG. 1 illustrates a widget television box 1 according to an embodiment of the system described herein. The box 1 is effectively a device able to execute widgets, and includes a widget engine 11, a storage device for storing widgets 2 as well as the hardware for providing a video/image overlay on a television and hardware for providing remote connectivity.

The widget box 1 can be installed by connecting its SCART connection 4 to the television 5. Other apparatus 6, such as a DVD player, video player, personal video recorder (PVR), set top box, or free-view box, may also be connected to the television 5 through the widget box 1, via the SCART connection. It is to be appreciated that the SCART may provide a desirable connection, but that other approaches are possible, such as using coaxial cables.

Once connected, the widget box 1 is capable of executing one or more widgets from its widget store and displaying the output on the television screen. The video-image output from the widget may be superimposed over the picture on the television, such as the images from the apparatus 6. However, the video overlay approach is not essential, and for a low cost implementation, the output may be displayed on the screen exclusively.

The actual process of overlaying video and/or images is a known technique, and can be implemented using a real time video annotation controller. For example, the VAC104+ from Advanced Microperipherals Ltd is such a controller for PC/104+ systems. This controller accepts live video from a PAL/NTSC analogue source, generates computer graphics and blends them with the video. The VAC104+ can be configured to provide a composite PAL/NTSC analogue video output for driving a television monitor or as component RGB for RS170 requirements.

The widget box 1 in this embodiment of the system described herein has data network (e.g. Internet) connectivity. This may be achieved directly or indirectly by one or more different options. For example, the widget box may have a direct connection 7 to the Internet, such as via WiFi, a telephone landline or Powerline. This connection may be towards a dedicated widget server 8. The widget box 1 may also obtain Internet access indirectly via a mobile terminal 9. The mobile terminal may have a compatible "WidgetTV" application installed. The term "mobile terminal" covers any portable computer device with Internet connectivity, including a mobile phone, PDA and a portable computer, among other devices.

In this implementation the widget box 1 may communicate with the widget application installed on the mobile terminal via Bluetooth™ (or other suitable wireless technology). The mobile terminal may then access the Internet (e.g. remote server 8) via a mobile communication network, and forward the accessed information to the widget box 1, again using Bluetooth™.

This embodiment has advantages over the WiFi/Powerline connectivity embodiment, in that it enables the widget box to be produced without the WiFi/Powerline associated hardware, which reduces its cost. In other words, through the use of an existing mobile terminal belonging to the user, this embodiment enables existing mobile technology to be leveraged in order to minimise the overall implementation cost of the widget box.

In a further alternative, the widget box 1 may be provided with a SIM and a mobile wireless chipset, so that it has its own mobile communication network connectivity. In the interests in keeping costs down, the chipset may be a 2G chipset. In this regard, since widgets tend to be less bandwidth intensive than a traditional browsing session, the 2G chipset may provide an acceptable end user service quality. Whilst a 3G chipset could be used, the cost of this would be significantly greater. A further benefit of using the 2G chipset/SIM combination is that the user does not have to concern themselves with configuring the widget box 1 for use with a WLAN or connecting up their Internet router.

Widget boxes as just described may be particularly advantageous arrangements, as they may be utilised in conjunction with any television set without the television requiring modification. It is a device that allows widgets to be displayed and utilised using a television set, in a simple and cost-effective manner.

Alternatively, or in addition to a mobile terminal providing the widget box 1 with indirect Internet connectivity, the mobile terminal may be configured to provide a remote control functionality. In this regard, the widget application on the mobile terminal 9 communicates with the widget engine 11 via an appropriate wireless technology. The widget application may be implemented in Java or a technology native to the terminal. This application provides an interface for the user, and allows the user to select and activate individual widgets stored in the storage 2 of the widget box 1. Thereafter, all key presses on the mobile application may be transmitted over the wireless connection to the individual widget for handling.

The widget application on the terminal may also provide the user with a means for navigating the widget's user interface, as displayed on the television screen 5 and/or the mobile terminal's screen. The mobile application may also provide a television view mode, in order to allow the user to rearrange the widgets on the television screen. This allows users to take control of the widget layout and position widgets where they want on the television screen.

Therefore, overall, the mobile application may provide a simple mechanism to remotely control the widget box and the widgets it executes, including switching the widget overlay on, and thereafter allowing the user to organise and display multiple widgets on the television screen. Another functionality that the mobile application may have is to display widgets on, and hide from, the television screen. In this way, the mobile terminal is able to control and interact with the television widgets of the widget box 1. The graphical user interface of the mobile application may be of any type, including a carousel, grid or "cover flow" arrangement.

Alternatively, or additionally, the mobile terminal application may be configured to provide the widget box 1 with a widget discovery functionality. The mobile terminal, using a browser or the widget application on the terminal, may allow the user to browse online widget catalogues. In this regard, the mobile terminal/widget application provides an interface for the user to discover new widgets.

When a new widget is discovered that the user would like to utilise on their widget box 1, the application on the mobile terminal may select the widget and download it.

The widget may be downloaded onto the mobile terminal and then transferred wirelessly to the widget box 1, where it is stored in the widget storage 2 until needed. Alternatively, the available widgets may be stored on the widget server 8, and the mobile terminal, via a web page associated with the server 8, selects one or more widgets on the server 8 that it would like to download to the widget box 1. After this selection, to download the widgets onto the widget box 1, the widget engine 11 may be configured to intermittently poll the widget server at regular intervals to determine if the user has selected any widgets to download. Another approach is, if the widget box 1 includes a chipset/SIM combination, for the widget server to be configured to send an SMS notification when the user does select a widget to download, such that the SMS serves as a trigger for the widget box 1 to effect the download.

Another approach for the widget box to be provided with a widget discovery functionality is using a pre-provisioned widget in the widget storage 2 of the widget box 1, which provides the means to discover and download new widgets. This approach requires the widget box 1 to have a direct connection to the Internet. As indicated previously, this may be achieved via various techniques, including WiFi, Powerline and a 2G chipset/SIM combination.

It is to be appreciated that these are merely examples of how the widgets may be downloaded onto the widget box 1, and that other approaches are possible. For example, in the embodiment where a 2G chipset and SIM are utilised, the option of pushing widgets directly to the widget box 1 is made possible. This enables the mobile terminal 9 to remotely push widgets, using for instance Multimedia Messages or WAP Push SMS messages, where applicable. This would be advantageous where the mobile terminal is not within Bluetooth contact distance of the box 1.

Additionally, third parties may push widget updates to the widget box 1, or widgets for any other purpose, including personalised widgets (e.g. corresponding to topics of interest to the user) or even "widgets of the week". For security reasons, it is preferable that the widget box only downloads widgets from one or more specific trusted servers. Alternatively, specific messages may be sent via the SIM/2G chipset that provide a white-list of Fully Qualified Domain Names (FQDN) (i.e. URLs) from which the widget box is allowed to download widgets In another example, the application on the mobile terminal may discover new widgets on an independent website and effect the download of the new widget on to the widget server 8. The widget server 8 could then download the new widget onto the widget box 1, such as described above.

In this regard, the widget server 8 may be implemented in various ways, including simply as a hosting site for the widgets that are available to download, or with greater controlling and support functionality for the widget box 1. For example, the widget server 8 may be configured to track each user's downloads so that in the event of an error or hardware update, a user may easily re-download their widgets. Also, the widget server 8 may be configured to handle widget updates, by presenting the updates for download, when they become available. In its more advanced form, the server may be configured to implement logic to hand push notifications, such as to support the remote download functionality. The push notifications may also be used by remote web-services to provide widgets to the widget box 1, and to enable this, the server 8 may offer an API which the web-services may access.

These embodiments of the system described herein, where the mobile terminal is able to discover new widgets independently of the widget box, are particularly advantageous embodiments, as they allow authorised users of the widget box 1 to remotely download widgets that they would like to implement using their widget box. Therefore the widget box is able to be updated by a user, without the user having to be physically present. The user is also able to effectively remotely instruct the download of a widget as and when the user becomes aware of the widget rather than requiring the user to remember to implement the download when they return home. Instead, by enabling the remote download, when the user then returns home, the widget will be available on the widget box 1 for the user to immediately use.

Figure 2:
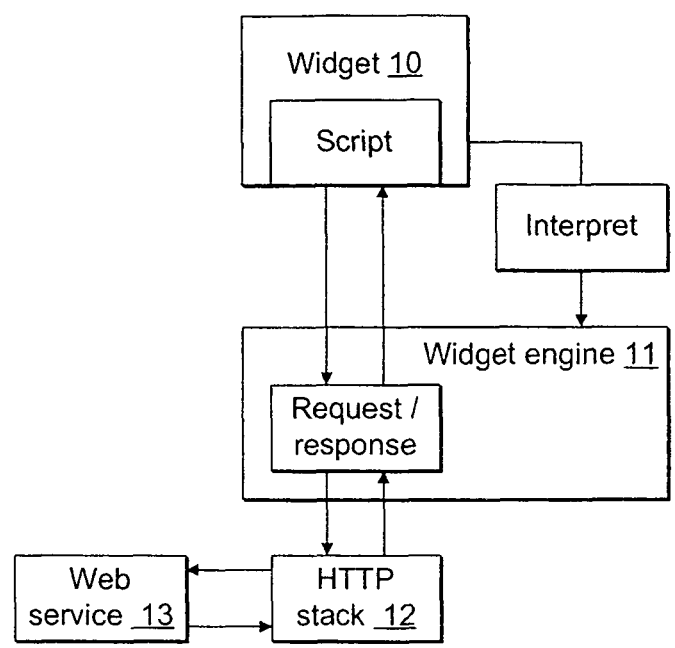
FIG. 2 illustrates a simplified architecture of an example widget framework that may be utilised on the widget box according to an embodiment of the system described herein.

With reference to FIG. 2, a simplified architecture of a widget engine framework that may be utilised is shown. Each widget 10, or application, is in communication with the widget engine 11 and may be stored in the widget storage 2. For simplicity, only one widget 10 is shown in FIG. 1, but the widget engine 11 is configured to manage multiple widgets.

In order to minimise their complexity, each widget is preferably created using a Scripting language. When a widget is implemented, the widget engine 11 functionally interprets the script. The script may include a request for information from a web service 13.

In other words, the widget engine 11 may provide a runtime environment for the independent execution of each of the widgets. The widget engine 11 may use a Javascript runtime environment combined with an XML interpreter, however other platforms are possible. Javascript and XML are preferable as they are open standards and therefore usable in many different operating systems, computer architectures and web browsers.

In addition to script interpretation, the widget engine 11 may provide each widget with lifetime management and Application Programming Interfaces (APIs) such as presentation APIs and HTTP-related APIs. Where presentation APIs are used, they take advantage of today's advanced graphics, and allow widgets to blend fluidly into the television screen 5 without the constraints of traditional window borders. HTTP-related APIs, such as XML Interpreters, provide access to the Internet and web services, via an interface to the HTTP stack 12. It is to be appreciated that the Hypertext Transfer Protocol (HTTP) is currently the most widely used transport protocol to convey information about the worldwide web, but other protocols could be used. Similarly, information may be conveyed in Hypertext Mark-up Language (HTML) or Extended Hypertext Mark-up Language (XHTML or XML) files, although again, other formats could be used.

To illustrate an embodiment of the system described herein, with a mobile application controlling the widget box, to activate a particular widget a command would be received from the mobile terminal, via the wireless connection. This command would be received by the widget engine 11, which would then extract the requested widget from the widget store, and run the widget in the runtime environment. The widgets may receive up-to-date information from a remote site, such as the latest weather forecast from the web address 13 of the widget server 8. In order to request and receive the required data the widget engine 11 invokes an HTTP-related API which conveys the request to the web address 13 via the HTTP Stack 12. The HTTP Stack 12 serves to translate the request according to the Protocol requirements, so that it can be transmitted across the Internet. Upon receiving the requested information, the widget engine 11 provides the data to the widget, which then incorporates the data into its procedures and sends the resultant data towards the television screen for display.

Each widget 10 may also be configured to seek access to the web service 13 intermittently, for example once every ten minutes. The widget engine 11 may, upon receiving the access request, interpret the script and seek access the pre-determined network address 13 from which to extract the required information. For example, if the widget 10 is a stock market widget, it would be looking to update its stock quotes from a remote server, such as the widget server 8. As indicated previously, this Internet connectivity can be obtained by various means.

The use of widgets on televisions is an advancement over and above the teletext services and streamed interactive services that are currently available on televisions. Teletext services are relatively slow and cumbersome to use due to the need to navigate to the appropriate page. Further, interactive services, which aim to enhance the viewing experience by supplementing a video signal with additional information, is restrictive in that viewers can only view what the broadcaster provides. By their nature, widgets, on the other hand, tend to be highly focussed offering a convenient way to package information that the user wants on a regular basis, including weather forecasts, stock and share quotes and sport scores. The widget box also need not be restricted to certain proprietary widgets, but be able to implement any compatible, independently created widget that may be available over the Internet. Furthermore since widgets are developed using common web standards it is possible for a user to develop their own personalised widgets. In this manner widgets can have access to the "long-tail" of the Internet.

The functionality of the widget box in the embodiments just described may be combined with additional functionalities. For example, the widget box may also support a digital picture frame functionality, allowing photos to be retrieved from an online gallery using a suitable widget (e.g. a Flickr™ widget), from a set of images stored in the widget box's memory store, or retrieved directed from the mobile device using, for example, Bluetooth.

A further additional functionality that may be implemented is that of a call or other event notification from other devices using Universal Plug and Play (UPnP) protocols, including the UPnP mobile extension. In this regard, UPnP is a protocol designed to allow devices to discover other devices on a network and allow them to interact dynamically with each other, by making their presence known to the other devices, informing them of their functionalities and responding to different control mechanisms. UPnP is designed to operate with devices that are on the same IP sub network, whilst the UPnP mobile extension supports device mobility (for an example of this see International Patent Application WO 2006/115862, which is incorporated herein by reference).

In the embodiments where a mobile phone is used as a controller of the widget box, the architecture of the widget box may also be configured to provide display specific phone events on the television screen, such as an incoming call. Where Java is used as the runtime environment, to implement this aspect of the system described herein, the mobile phone may support the relevant Java Specification Requests (JSRs), such as telephony and messaging JSRs.

Further, whilst the widgets in the embodiments have been described as being consumed by individual users, the widgets may include multi-user widgets. That is, multiple users may utilise such a widget at any one time. In order to support this feature the widget box may support multiple connections to various mobile devices so that they can all control the widget box.

Further, for the widget box associated with the 2G chipset and SIM combination, whilst SMS notifications were described in relation to triggering the widget box to download a widget, SIM notifications may equally be used for other purposes, particularly to trigger other specific behaviour such as to switch the widget box from on to standby and vice versa. Other uses of SMS messages include creating a White-list of usable URLs, providing remote updates of software of the widget box, or even for sending messages to a family/household message board, whereby family members can send SMS messages to the widget box for display on the television, so that other members of the family can read them.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of using a mobile terminal configured to access a wireless data network, the method comprising:
   wirelessly accessing the data network with the mobile terminal to identify one or more applications to download to an application execution device, wherein the one or more applications is configured to display content from the data network on a display device;
   executing a control application on the mobile terminal, the control application configured to:
   identify at least one application on a remote server that communicates with the application execution device;
   select the at least one application to be downloaded to the application execution device;
   cause a download of the at least one selected application from the remote server to the application execution device upon the selection of the at least one selected application, wherein the application execution device comprises a SIM and a wireless chipset that at least partially provides wireless data network connectivity;
   cause the at least one selected application to be downloaded to a storage of the application execution device via the mobile terminal in response to selecting the at least one application;
   cause a notification to be displayed on a display of the application execution device to provide notification regarding the at least one selected application;
   select one or more of the downloaded applications from the storage of the application execution device over the data network for activation at the application execution device;
   cause display of the selected download application on the display device; and
   allow a user to control the selected one or more applications displayed on the display device via a user interface on the mobile terminal.

2. The method of claim 1, wherein the control application is further configured to:
   cause the application execution device to intermittently poll the remote server; and
   cause the remote server to notify the application execution device that the at least one selected application has been selected for download upon receiving a polling message.

3. The method of claim 1, wherein the mobile terminal provides the application execution device with wireless data network connectivity, and wherein the method further comprises:
   downloading the at least one application onto the application execution device via the mobile terminal.

4. A non-transitory, computer readable medium encoded thereon with instructions that when executed cause a mobile terminal to perform a method comprising:
   wirelessly accessing a wireless data network to identify one or more applications to download to an application execution device, wherein the one or more applications is configured to display external content on a display device;
   identifying at least one application on a remote server that communicates with the application execution device;
   selecting the at least one application to be downloaded to the application execution device;
   causing a download of the at least one selected application from the remote server to the application execution device upon the selection of the at least one selected application, wherein the application execution device comprises a SIM and a wireless chipset that at least partially provides wireless data network connectivity;

causing the at least one application to be downloaded to a storage of the application execution device via the mobile terminal in response to selecting the at least one application;

causing a notification to be displayed on a display of the application execution device to provide notification regarding the at least one selected application;

selecting one or more of the downloaded applications from the storage of the application execution device over the data network for activation at the application execution device;

causing display of the selected downloaded application on the display device; and allowing a user to control the selected one or more applications displayed on the display device via a user interface on the mobile terminal.

5. A mobile terminal, comprising:

a controller configured to:

wirelessly access a wireless data network to identify one or more applications to download to an application execution device, wherein the one or more applications is configured to display external content on a display device, identify at least one application on a remote server that communicates with the application execution device, select the at least one application to be downloaded to the application execution device, cause a download of the at least one selected application from the remote server to the application execution device upon the selection of the at least one selected application, wherein the application execution device comprises a SIM and a wireless chipset that at least partially provides wireless data network connectivity, cause the at least one application to be downloaded to a storage of the application execution device via the mobile terminal in response to selecting the at least one application, cause a notification to be displayed on a display of the application execution device to provide notification regarding the at least one selected application, select one or more of the downloaded applications from the storage of the application execution device over the data network for activation at the application execution device, cause display of the selected downloaded application on the display device, and allow a user to control the selected one or more applications displayed on the display device via a user interface on the mobile terminal; and a housing containing the controller.

6. The method of claim 1, wherein the control application is further configured to:

download the at least one application first to the mobile terminal; and wirelessly transfer the at least one downloaded application from the mobile terminal to the application execution device.

7. The method of claim 1, wherein the control application is further configured to wirelessly communicate information to trigger the download of the at least one application from a network directly to the application execution device.

8. The non-transitory, computer readable medium of claim 4, wherein the method further comprises:

downloading the at least one application first to the mobile terminal; and wirelessly transferring the at least one application from the mobile terminal to the application execution device.

9. The non-transitory, computer readable medium of claim 4, wherein the method further comprises:

wirelessly communicating information to trigger the download of the at least one application from a network directly to the application execution device.

10. The mobile terminal of claim 5, wherein the controller is further configured to:

download the at least one application first to an intermediate device; and wirelessly transfer the at least one application to the application execution device.

11. The mobile terminal of claim 5, wherein the controller is further configured to wirelessly communicate information to trigger the download of the at least one application from a network directly to the application execution device.

12. The method of claim 1, wherein the control application is further configured to control and interact with the application executed on the application execution device.

13. The method of claim 1, wherein the control application is further configured to cause the at least one selected application to be downloaded to the application execution device via the mobile terminal control using another wireless data network.

14. The non-transitory, computer readable medium of claim 4, wherein the method further comprises controlling and interacting with the application executed on the application execution device.

15. The non-transitory, computer readable medium of claim 4, wherein the method further comprises causing the at least one selected application to be downloaded to the application execution device via the mobile terminal control using another wireless data network.

16. The mobile terminal of claim 5, wherein the controller is further configured to control and interact with the application executed on the application execution device.

17. The mobile terminal of claim 5, wherein the controller is further configured to cause the at least one selected application to be downloaded to the application execution device via the mobile terminal control using another wireless data network.

18. The method of claim 1, wherein the notification that is displayed on the display of the application execution device is an SMS message that is received at the application execution device.

19. The mobile terminal of claim 5, wherein the application execution device is included as a part of the mobile terminal such that the at least one application is downloaded onto the mobile terminal.

20. The method of claim 1, wherein the application execution device is included as a part of the mobile terminal such that the at least one application is downloaded onto the mobile terminal.

21. The non-transitory, computer readable medium of claim 4, wherein the application execution device is included as a part of the mobile terminal such that the at least one application is downloaded onto the mobile terminal.

* * * * *